United States Patent
Sishtla et al.

(10) Patent No.: US 9,091,759 B1
(45) Date of Patent: Jul. 28, 2015

(54) SMART BEAM SELECTION FOR RADAR AIDED NAVIGATION

(71) Applicants: Venkata A. Sishtla, Marion, IA (US); Mark B. Godfrey, Melbourne, FL (US); James H. Doty, Cedar Rapids, IA (US); Keith L. Kerley, Satellite Beach, FL (US)

(72) Inventors: Venkata A. Sishtla, Marion, IA (US); Mark B. Godfrey, Melbourne, FL (US); James H. Doty, Cedar Rapids, IA (US); Keith L. Kerley, Satellite Beach, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 238 days.

(21) Appl. No.: 13/767,390

(22) Filed: Feb. 14, 2013

(51) Int. Cl.
  *G01S 13/60* (2006.01)
  *G01S 13/95* (2006.01)
  *G01S 13/00* (2006.01)

(52) U.S. Cl.
  CPC .............. *G01S 13/60* (2013.01); *G01S 13/953* (2013.01)

(58) Field of Classification Search
  CPC ....... G01S 13/58; G01S 13/581; G01S 13/60; G01S 13/62; G01S 13/64; G01S 13/88; G01S 13/94; G01S 13/95; G01S 13/953; G01S 13/955

USPC ............... 342/26 R, 26 A, 26 B, 59, 61–65, 342/104–118, 120–123, 159–165, 173–175, 342/195, 73–81, 89, 91
  See application file for complete search history.

(56) References Cited

U.S. PATENT DOCUMENTS

| | | | | |
|---|---|---|---|---|
| 3,013,262 A | * | 12/1961 | Tollefson | 342/117 |
| 3,184,736 A | * | 5/1965 | Badewitz | 342/63 |
| 3,340,528 A | * | 9/1967 | Atlas | 342/26 R |
| 3,362,024 A | * | 1/1968 | Badewitz | 342/63 |
| 3,373,428 A | * | 3/1968 | Atlas | 342/26 R |
| 3,472,471 A | * | 10/1969 | Badewitz | 342/62 |
| 4,103,302 A | * | 7/1978 | Roeder et al. | 342/117 |
| 4,698,636 A | * | 10/1987 | Marlow et al. | 342/104 |
| 4,723,123 A | * | 2/1988 | Marlow et al. | 342/109 |
| 8,643,533 B1 | * | 2/2014 | Woodell et al. | 342/26 B |

\* cited by examiner

*Primary Examiner* — Bernarr Gregory
(74) *Attorney, Agent, or Firm* — Angel N. Gerdzhikov; Donna P. Suchy; Daniel M. Barbieri

(57) ABSTRACT

A method of determining the ground speed or drift angle of an aircraft is described. It is determined whether or not a weather threshold has been met based on returns of a radar beam which is pulse compressed in a first scan. If the weather threshold is determined to have not been met, a ground speed or drift angle of the aircraft is determined based on Doppler processing of radar beam returns of a radar beam in a second scan. If the weather threshold has been met, a bottom radar beam is directed lower to the ground, and a ground speed or drift angle of the aircraft is determined based on Doppler processing returns of the bottom radar beam directed lower to the ground. A corresponding radar system is also described.

20 Claims, 3 Drawing Sheets

SMART BEAM SELECTION FOR RADAR AIDED NAVIGATION

BACKGROUND

The present disclosure relates generally to the field of aircraft radar systems. More specifically, the application relates to a radar system for determining the ground speed or drift angle of an aircraft in a different manner depending on whether or not weather is detected.

Doppler weather radar systems for aircraft may be used for wind shear detection using wind shear processing based on Doppler processing on radar beam returns to determine a high gradient of wind velocities in a localized area.

Doppler processing in Doppler weather radar systems may also be used to determine aircraft ground speeds as well as aircraft drift angle based on spectral processing, where the speed of the aircraft relative to the ground is determined. The aircraft drift angle is the horizontal angle between the long axis of the aircraft and the tangent to its path. Current generation radars can detect aircraft ground speeds to within a few knots using Doppler processing.

Detecting aircraft ground speeds using Doppler processing, however, may be inaccurate especially in the presence of heavy precipitation. The weather may contaminate the radar returns resulting in the inaccuracy.

External sensors such as inertial navigation systems or GPS systems, may also determine the aircraft ground speed. If such external sensors fail, Doppler weather radar systems may be used to determine the aircraft ground speed. In this case, the failure of Doppler processing using conventional Doppler weather radar systems to accurately detect ground speeds in the presence of weather is particularly problematic.

Therefore, there is a need for an aircraft radar system and method to accurately determine aircraft ground speed as well as drift angle in the presence of weather.

SUMMARY

According to one exemplary embodiment, there is provided a method of determining the ground speed or drift angle of an aircraft. The method comprises: determining, via a processor, whether or not a weather threshold has been met based on returns of a radar beam which is pulse compressed in a first scan; if the weather threshold is determined to have not been met: determining a ground speed or drift angle of the aircraft based on Doppler processing of radar beam returns of a radar beam in a second scan; and if the weather threshold has been met: directing a bottom radar beam lower to the ground; and determining a ground speed of the aircraft based on Doppler processing returns of the bottom radar beam directed lower to the ground.

According to an aspect of the embodiment, in the case that the weather threshold is determined to have not been met, the Doppler processing is of radar beam returns of a plurality of different radar beams.

According to an aspect of the embodiment, the plurality of different radar beams include radar beams of a four beam multiscan system.

According to an aspect of the embodiment, the four beam multiscan system includes the bottom radar beam, two radar beams for general weather processing directed above the bottom radar beam, and a vertical weather beam directed above the two radar beams for general weather processing.

According to an aspect of the embodiment, pulse compression in the first scan is based on phase codes or frequency coded pulses.

According to an aspect of the embodiment, pulse compression in the first scan is based on Barker coded pulses.

According to an aspect of the embodiment, the determining whether or not a weather threshold has been met is based on one or more of the power difference between the peaks and null of the radar returns, the existence of a pedestal region of the radar returns, or a lower number of peak to noise floor hits of the radar returns.

According to an aspect of the embodiment, the Doppler processing of radar beam returns comprises processing of radar beam returns of a radar beam having Barker coded pulses.

According to an aspect of the embodiment, the Barker coded pulses have a resolution of about 50 meters or less.

According to another exemplary embodiment, there is provided a radar system. The radar system comprises: an antenna; a transmitter coupled to the antenna for causing the antenna to emit one or more radar beams; a receiver coupled to the antenna for receiving radar beam returns from the antenna; and a processor configured to: control the transmitter to cause the antenna to emit the one or more radar beams; determine whether or not a weather threshold has been met based on returns of a radar beam which is pulse compressed in a first scan; if the weather threshold is determined to have not been met: determine a ground speed or drift angle of the aircraft based on Doppler processing of radar beam returns of a radar beam in a second scan; and if the weather threshold has been met: direct a bottom radar beam lower to the ground; and determine a ground speed or drift angle of the aircraft based on Doppler processing returns of the bottom radar beam directed lower to the ground.

According to an aspect of the embodiment, the antenna has a diameter of less than 30 inches.

According to an aspect of the embodiment, in the case that the weather threshold is determined to have not been met, the Doppler processing is of radar beam returns of a plurality of different radar beams.

According to an aspect of the embodiment, the plurality of different radar beams include radar beams of a four beam multiscan system.

According to an aspect of the embodiment, the four beam multiscan system includes the bottom radar beam, two radar beams for general weather processing directed above the bottom radar beam, and a vertical weather beam directed above the two radar beams for general weather processing.

According to an aspect of the embodiment, the processor is configured to provide pulse compression in the first scan based on phase codes or frequency coded pulses.

According to an aspect of the embodiment, pulse compression in the first scan is based on Barker coded pulses.

According to an aspect of the embodiment, the processor is configured such that the determining whether or not a weather threshold has been met is based on one or more of the power difference between the peaks and null of the radar returns, the existence of a pedestal region of the radar returns, or a lower number of peak to noise floor hits of the radar returns.

According to an aspect of the embodiment, the processor is configured such that the Doppler processing of radar beam returns comprises processing of radar beam returns of a radar beam having Barker coded pulses.

According to an aspect of the embodiment, the Barker coded pulses have a resolution of about 50 meters or less.

Another embodiment of the invention relates to a non-transitory computer readable medium storing a program, which when executed by a processor, causes the computer to execute a method of determining the ground speed or drift angle of an aircraft. The executed method comprises: determining whether or not a weather threshold has been met based on returns of a radar beam which is pulse compressed in a first scan; if the weather threshold is determined to have not been met: determining a ground speed or drift angle of the aircraft based on Doppler processing of radar beam returns of a radar beam in a second scan; and if the weather threshold has been met: directing a bottom radar beam lower to the ground; and determining a ground speed or drift angle of the aircraft based on Doppler processing returns of the bottom radar beam directed lower to the ground.

BRIEF DESCRIPTION OF THE DRAWINGS

The disclosure will become more fully understood from the following detailed description, taken in conjunction with the accompanying drawings, wherein like reference numerals refer to like elements.

DETAILED DESCRIPTION OF THE EXEMPLARY EMBODIMENTS

Figure 1:
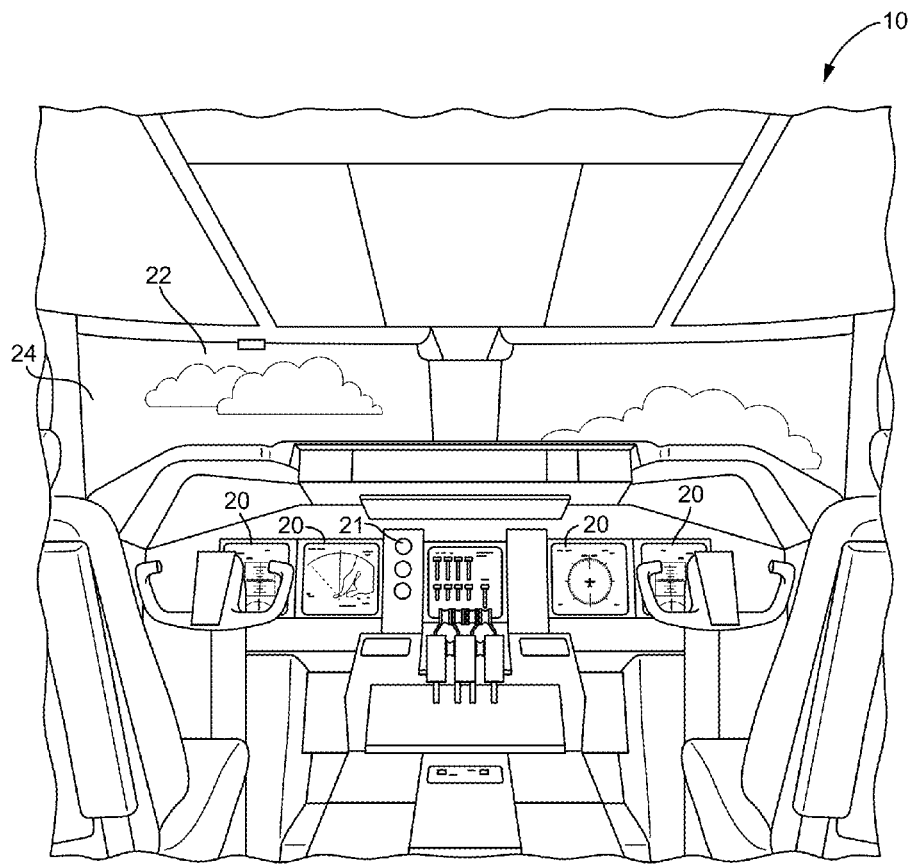
FIG. 1 is a schematic illustration of an aircraft control center or cockpit for an aircraft according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of an aircraft control center or cockpit 10 is shown, according to one exemplary embodiment. Aircraft control center 10 includes flight displays 20. Flight displays 20 can be used to provide information to the flight crew, thereby increasing visual range and enhancing decision-making abilities.

In an exemplary embodiment, flight displays 20 can provide an output from a radar system of the aircraft. Flight displays 20 can include a weather display, a joint display, a weather radar map and a terrain display. Further, flight displays 20 may include an electronic display or a synthetic vision system (SVS). For example, flight displays 20 can include a display configured to display a three dimensional perspective image of terrain and/or weather information. Other view of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Aircraft control center 10 additionally includes one or more user interface (UI) elements 21. UI elements 21 can include dials, switches, buttons, touch screens, or any other user input device. UI elements 21 can be used to adjust features of flight displays 20, such as contrast, brightness, width, and length. UI elements 21 can also (or alternatively) be used by an occupant to interface with or change the displays of flight displays 20. UI elements 21 can additionally be used to acknowledge or dismiss an indicator provided by flight displays 20. Further, UI elements 21 can be used to correct errors on the electronic display.

Figure 2:
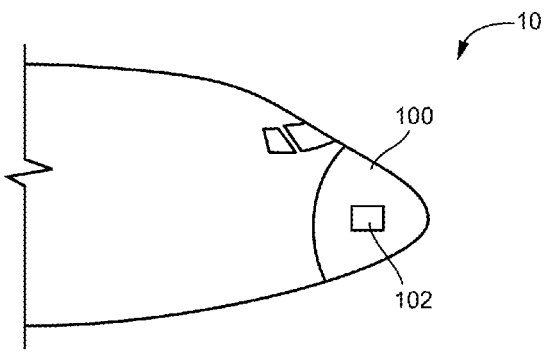
FIG. 2 is a side view schematic drawing of a front portion of the aircraft including a radar system according to an exemplary embodiment.

Referring to FIG. 2, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 can be located on the top of the aircraft or on the tail of the aircraft. Yet further, radar system 102 can be located anywhere on the aircraft. Furthermore, the various components of radar system 102 can be distributed at multiple locations throughout the aircraft. Additionally, radar system 102 can include or be coupled to an antenna system of the aircraft.

Figure 3:
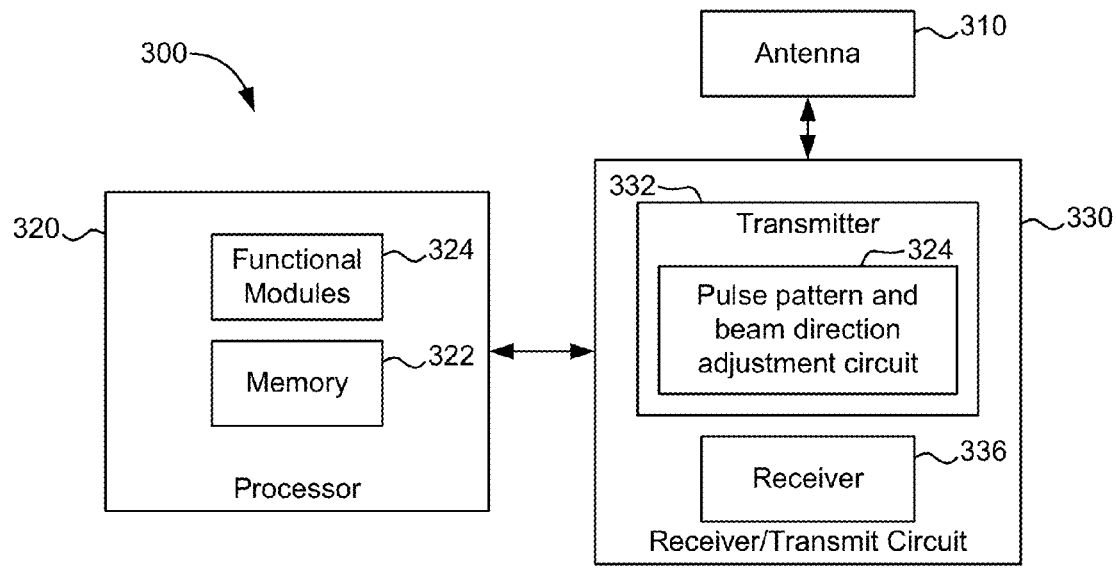
FIG. 3 is a general block diagram of the aircraft radar system illustrated in FIG. 2 according to an exemplary embodiment.

Referring to FIG. 3, in one exemplary embodiment, a radar system 300 includes an antenna 310, a processor 320, and a receive/transmit circuit 330. The radar system 300 may be, for example, a Multiscan™ radar system manufactured by Rockwell Collins, such as an RTA-4XXX, configured as described herein. The antenna 310 may have a diameter of less than 30 inches, for example. Other diameters are possible for the antenna 310.

The radar system 300 may be a plural radar beam system used for weather detection. The radar system 300 may be a four beam multiscan system, for example, where two of the beams are used for general weather processing, a bottom beam is directed below the two beams, and another beam, such as for a vertical weather display, is directed above the two beams. At lower altitudes the bottom beam can be used for determining the ground speed or drift angle.

The processor 320 may include a memory 322 and functional modules 324. The functional modules 324 may be stored on a non-transitory computer readable medium, and may include hardware components or software/hardware components. The memory 322 may include a non-transitory computer readable medium, and the modules 324 may be stored therein.

The receive/transmit circuit 330 may include a transmitter 332 with a pulse pattern and beam orientation adjustment circuit 334. The pulse pattern and beam direction adjustment circuit 334 sets the pulse pattern of the radar beam pulses emitted by the antenna 310 based on control by the processor 320. The pulse pattern and beam direction adjustment circuit 334 further adjusts the direction of the radar beam emitted by the antenna 310 based on control by the processor 320.

The receive/transmit circuit 330 may include a receiver 336 coupled to the antenna 310 and configured to receive radar beam returns from the antenna 310. The receiver 336 provides the radar returns or data associated with the radar returns to processor 320. Processor 320 is generally configured to process data associated with returns received by antenna 310 based on the functional modules 324.

Figure 4:
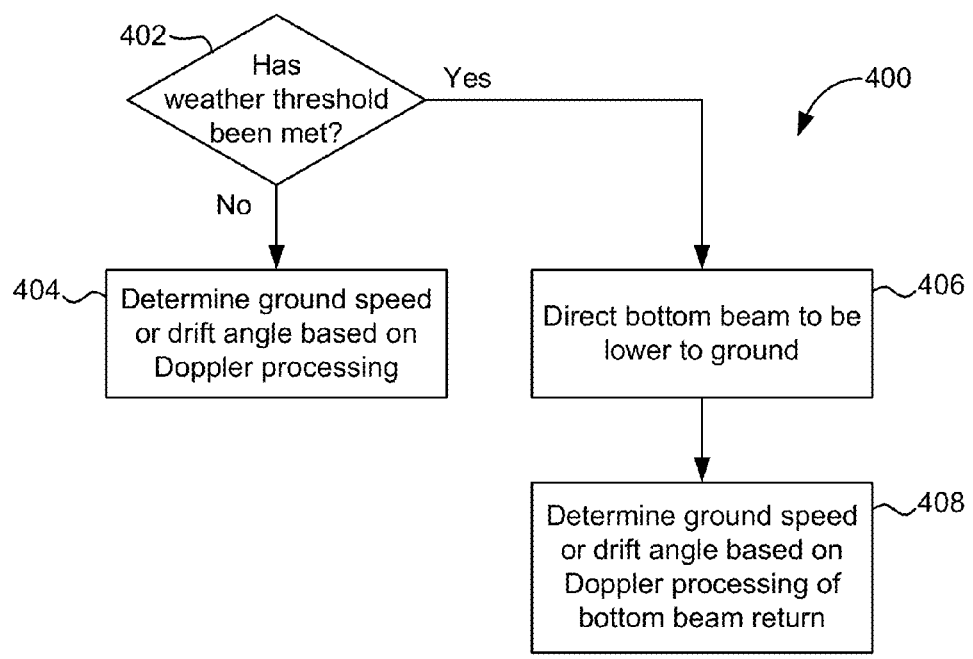
FIG. 4 is a process flow diagram of a method for determining the ground speed or drift angle of an aircraft using the radar system of FIG. 3 according to an exemplary embodiment.

With reference to FIG. 4, a method 400 of determining the ground speed or drift angle of an aircraft performed by the radar system 300 according to an exemplary embodiment is described. The processor 320 is configured to execute the method 400 based on the functional modules 324.

At a step 402, the processor determines whether or not a weather threshold has been met based on radar returns from the antenna 310. The weather threshold is an indication that weather contamination is too severe for the ground speed or drift angle of the aircraft to be determined based merely on Doppler processing as is.

In step 402, the processor 320 provides control such that a pulse compressed radar beam is emitted by the antenna 310. The pulse compressed radar beam, which may be phase coded or frequency coded for example, allows for high resolution processing of the radar returns, while still providing for sufficient power. The pulses for pulse compression based on phase coding may be Barker pulses, for example. The resolution of the pulse compression radar beam may be about 50 meters or less, for example.

Figure 5A:
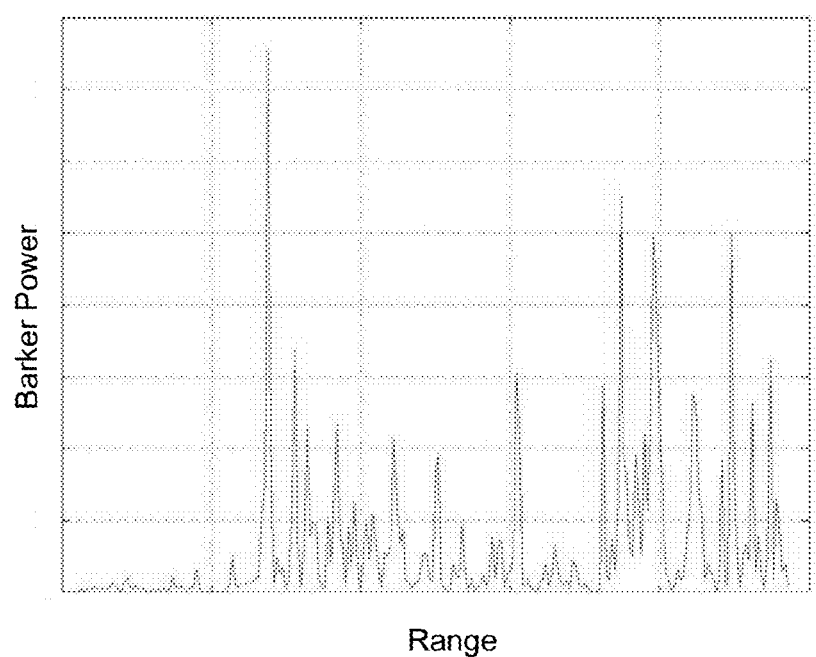
FIG. 5A is a graph illustrating the power returns of a Barker coded radar beam due to ground clutter.
Figure 5B:
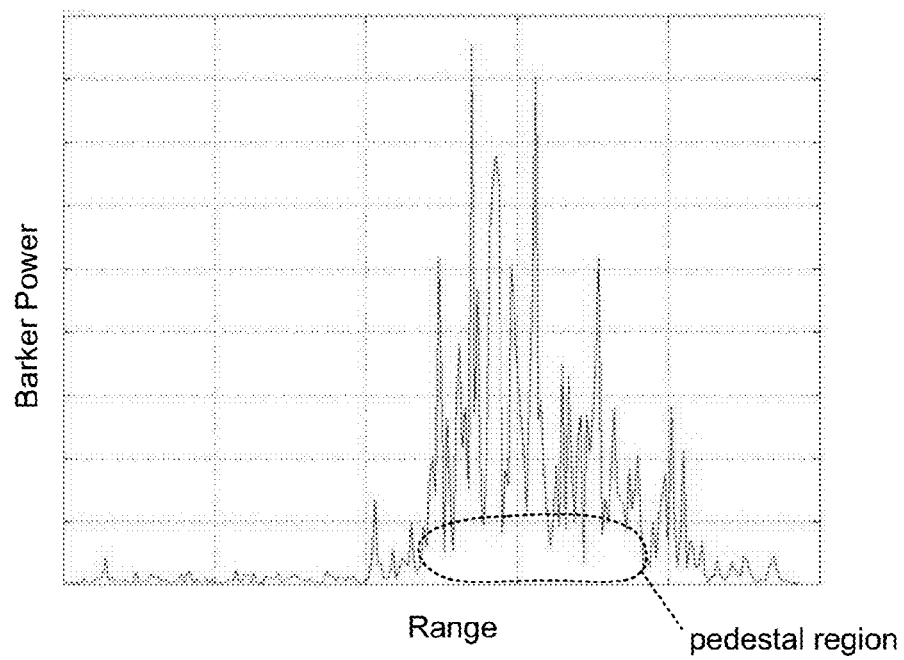
FIG. 5B is a graph illustrating the power returns of a Barker coded radar beam due to weather.

FIGS. 5A and 5B illustrate an example of power returns from Barker coded pulses based on ground clutter (FIG. 5A) and based on weather (FIG. 5B). The y-axis in FIGS. 5A and 5B is the power of the returns, while the x-axis is the distance (range) from the antenna. The different signatures of the power returns based on ground clutter and weather allow for detection of weather based on the Barker codes pulses.

As can be seen from FIG. 5A, the power returns from Barker coded pulses based on ground clutter have the following characteristics of the ground clutter signature: (1) The power difference between the peaks and null (zero power) tends to be higher. (2) The power returns tend to extend all the way to a noise floor. (3) There are a higher number of peak to noise floor hits due to ground clutter than due to weather (see FIG. 5B).

As can be seen from FIG. 5B, the power returns from Barker coded pulses based on weather have the following characteristics of the weather signature. (1) The power difference between the peaks and null (zero power) tends to be lower than that due to ground clutter. (2) The power returns tend to rise from, and fall to, a pedestal, which is a relatively wider and lower feature. (3) There are a lower number of peak to noise floor hits due to weather than due to ground clutter (see FIG. 5A).

Based on the characteristics of the weather signature, and the power returns of the Barker codes pulses, it is determined whether or not a weather threshold has been met. That is, whether or not a weather threshold has been met may be based on one or more of the power difference between the peaks and null of the radar returns, the existence of a pedestal region of the radar returns, or a lower number of peak to noise floor hits of the radar returns.

If the result of step 402 is no, a weather threshold has not been met, flow proceeds to step 404. In step 404 the ground speed or drift angle of the aircraft is determined by Doppler processing of radar beam returns of a radar beam in another scan. For example, if the system uses a plurality of radar beams, the ground speed or drift angle of the aircraft may determined by Doppler processing of multiple of the plurality of radar beams. This is, if it is determined that there is little contamination due to weather, the ground speed or drift angle of the aircraft may determined by Doppler processing as is, which would be performed by general processing using a weather radar system.

If the result of step 402 is yes, a weather threshold has been met, flow proceeds to step 406. In step 406 the processor 320 controls the direction of the bottom radar beam to be lower to the ground (the angle between the normal to the ground and the direction of the beam is increased) to avoid contamination of the weather. Directing the bottom radar beam much below the local aircraft flight level can help separate the weather from the ground. Because the bottom radar beam now sees much more ground than weather, Doppler processing can be used to more accurately determine the aircraft ground speed or drift angle by determining the relative speed of the aircraft to the ground. Further in step 406 the lower radar beam is controlled to have a Doppler pulse pattern providing high resolution.

The process proceeds from step 406 to step 408. At step 408 the ground speed or drift angle of the aircraft may determined by Doppler processing of the returns of the bottom radar beam, where such Doppler processing provides an estimate of the relative speed of the aircraft to the ground.

It should be noted that using the bottom beam to determine the aircraft speed does not significantly detract from using the multiscan process with multiple beams at low altitudes for weather detection. This is so because the bottom beam provides little value in the multiscan process at lower altitudes due to its positioning. Thus, the presently described system, which uses the lower beam directed lower to the ground to determine ground speed or drift angle in the case of weather being detected, does not significantly detract from a multiscan process at lower altitudes.

Using the bottom beam directed lower to the ground, which is not of significance in the multiscan process at lower altitudes, avoids the need of performing a stand alone scan for determining the aircraft speed, and thus avoids the problem where radar time cannot be shared between processes without violating MOPS (minimum operation performance standards). By substituting the existing lower beam for use as the beam used for Doppler processing, the problem can be avoided.

Further, because the existing beams of a weather radar system may be used, including the bottom beam, a weather radar system may be provided without additional cost, power or weight changes to the equipment installed on the aircraft. Thus, back-up inertial information that could be used in emergency situations, such as when GPS and inertial systems have failed, is provided without the additional cost, power or weight changes to the equipment.

Further, expensive inertial navigation systems to provide inertial information after the loss of GPS are not required. Instead, the back-up inertial information is provided with existing beams of the weather radar system.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A method of determining the ground speed or drift angle of an aircraft comprising:
   determining, via a processor, whether or not a weather threshold has been met based on returns of a radar beam which is pulse compressed in a first scan;
   if the weather threshold is determined to have not been met:
      determining a ground speed or drift angle of the aircraft based on Doppler processing of radar beam returns of a radar beam in a second scan; and
   if the weather threshold has been met:
      controlling an antenna to direct a bottom radar beam lower to the ground; and
      determining a ground speed or drift angle of the aircraft based on Doppler processing returns of the bottom radar beam directed lower to the ground.

2. The method of claim 1, wherein in the case that the weather threshold is determined to have not been met, the Doppler processing is of radar beam returns of a plurality of different radar beams.

3. The method of claim 2, wherein the plurality of different radar beams include radar beams of a four beam system.

4. The method of claim 3, wherein the four beam system includes the bottom radar beam, two radar beams for general weather processing directed above the bottom radar beam, and a vertical weather beam directed above the two radar beams for general weather processing.

5. The method of claim 1, wherein pulse compression in the first scan is based on phase codes or frequency coded pulses.

6. The method of claim 5, wherein pulse compression in the first scan is based on Barker coded pulses.

7. The method of claim 1, wherein the determining whether or not a weather threshold has been met is based on one or more of the power difference between the peaks and null of the radar returns, the existence of a pedestal region of the radar returns, or a lower number of peak to noise floor hits of the radar returns.

8. The method of claim 1, wherein the Doppler processing of radar beam returns comprises processing of radar beam returns of a radar beam having Barker coded pulses.

9. The method of claim 8, wherein the Barker coded pulses have a resolution of about 50 meters or less.

10. A radar system comprising:
    an antenna;
    a transmitter coupled to the antenna for causing the antenna to emit one or more radar beams;
    a receiver coupled to the antenna for receiving radar beam returns from the antenna; and
    a processor configured to:
       control the transmitter to cause the antenna to emit the one or more radar beams;
       determine whether or not a weather threshold has been met based on returns of a radar beam which is pulse compressed in a first scan;
       if the weather threshold is determined to have not been met:
          determine a ground speed or drift angle of the aircraft based on Doppler processing of radar beam returns of a radar beam in a second scan; and
       if the weather threshold has been met:
          control the antenna to direct a bottom radar beam lower to the ground; and
          determine a ground speed or drift angle of the aircraft based on Doppler processing returns of the bottom radar beam directed lower to the ground.

11. The radar system of claim 10, wherein the antenna has a diameter of less than 30 inches.

12. The radar system of claim 10, wherein in the case that the weather threshold is determined to have not been met, the Doppler processing is of radar beam returns of a plurality of different radar beams.

13. The radar system of claim 12, wherein the plurality of different radar beams include radar beams of a four beam multiscan system.

14. The radar system of claim 13, wherein the four beam multiscan system includes the bottom radar beam, two radar beams for general weather processing directed above the bottom radar beam, and a vertical weather beam directed above the two radar beams for general weather processing.

15. The radar system of claim 10, wherein the processor is configured to provide pulse compression in the first scan based on phase codes or frequency coded pulses.

16. The radar system of claim 15, wherein pulse compression in the first scan is based on Barker coded pulses.

17. The radar system of claim 10, wherein the processor is configured such that the determining whether or not a weather threshold has been met is based on one or more of the power difference between the peaks and null of the radar returns, the existence of a pedestal region of the radar returns, or a lower number of peak to noise floor hits of the radar returns.

18. The radar system of claim 10, wherein the processor is configured such that the Doppler processing of radar beam returns comprises processing of radar beam returns of a radar beam having Barker coded pulses.

19. The radar system of claim 18, wherein the Barker coded pulses have a resolution of about 50 meters or less.

20. A non-transitory computer readable medium storing a program, which when executed by a processor, causes the computer to execute a method of determining the ground speed or drift angle of an aircraft comprising:
    determining whether or not a weather threshold has been met based on returns of a radar beam which is pulse compressed in a first scan;
    if the weather threshold is determined to have not been met:
       determining a ground speed or drift angle of the aircraft based on Doppler processing of radar beam returns of a radar beam in a second scan; and
    if the weather threshold has been met:
       controlling an antenna to direct a bottom radar beam lower to the ground; and
       determining a ground speed or drift angle of the aircraft based on Doppler processing returns of the bottom radar beam directed lower to the ground.

* * * * *